No. 722,531. PATENTED MAR. 10, 1903.
J. R. McGORON.
GRAZING STAKE.
APPLICATION FILED JUNE 23, 1902.
NO MODEL.
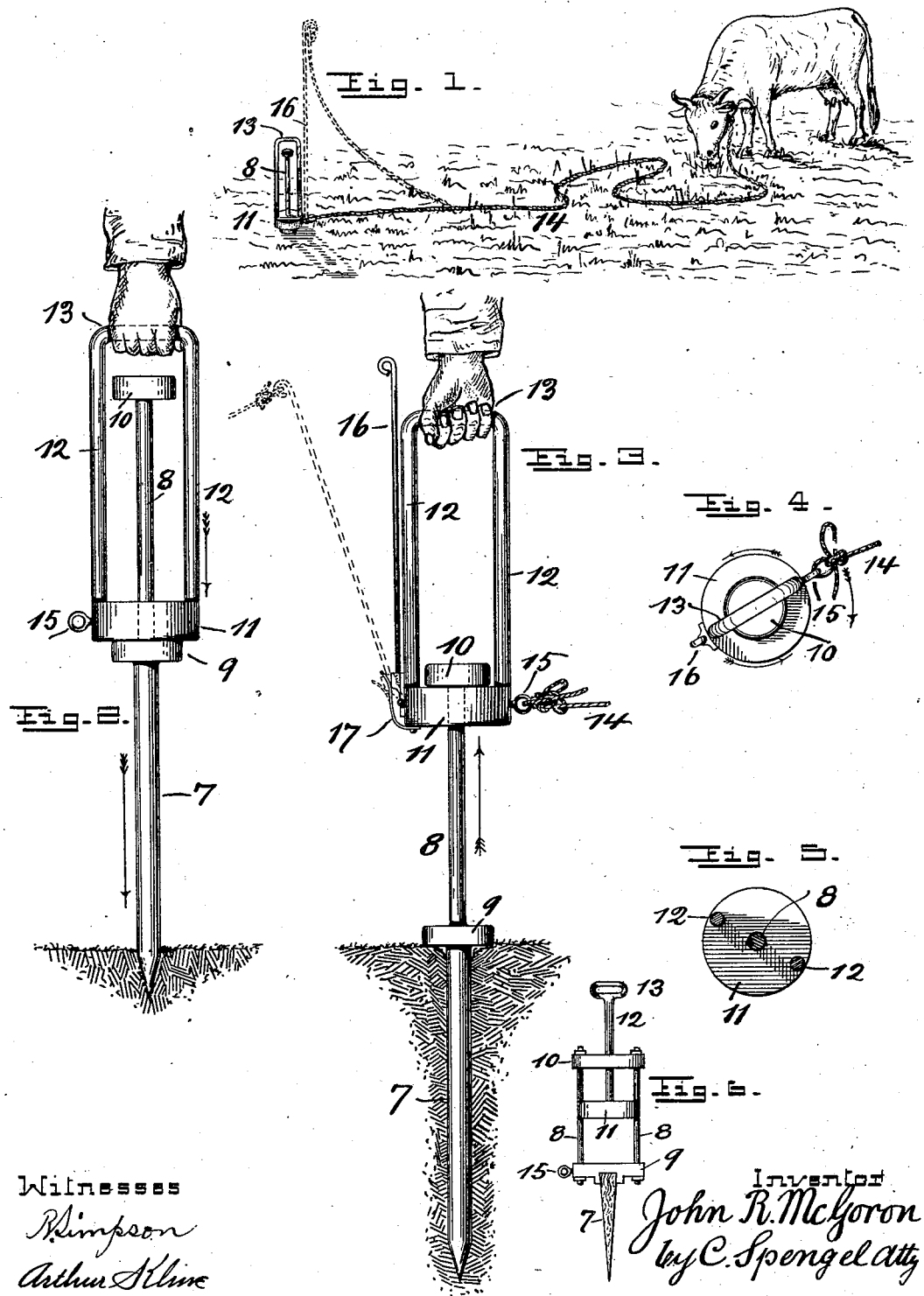

UNITED STATES PATENT OFFICE.

JOHN R. McGORON, OF TERRACE PARK, OHIO.

GRAZING-STAKE.

SPECIFICATION forming part of Letters Patent No. 722,531, dated March 10, 1903.

Application filed June 23, 1902. Serial No. 112,749. (No model.)

*To all whom it may concern:*

Be it known that I, JOHN R. McGORON, a citizen of the United States, residing at Terrace Park, in the county of Hamilton and State of Ohio, have invented a certain new and useful Grazing-Stake; and I do declare the following to be a clear, full, and exact description thereof, attention being called to the accompanying drawings, with the reference-numerals marked thereon, which form also a part of this specification.

This invention relates to a new and improved grazing-stake intended to serve as a means to which one end of a rope may be tied, an animal being fastened to the other end, the object being to confine such animal to a certain limited space while feeding, the stake being for such purpose driven into the ground, enabling the animal to graze around the same to an extent equivalent to the length of the rope. Whenever a change becomes desirable or necessary for want of food the position of the stake is changed to a new location.

In the tethering devices now most commonly used additional implements or tools are required to drive or pull the stake or its equivalent part which is secured to or held in the ground and which implements have to be carried along from place to place as the position of the stake is changed.

The object of my invention is to provide such a grazing or tethering stake which at the same time combines in one device the means for driving it into the ground and for pulling it out therefrom when its location is to be changed.

The invention consists, therefore, of the means and their arrangement and construction, all as hereinafter described, claimed, and illustrated in the accompanying drawings, in which—

Figure 1 shows the device in position and the manner of its use. Fig. 2 is an enlarged view showing its manipulation for securing it in position within the ground. Fig. 3 in a similar view shows manipulation for withdrawing it from its position within the ground. Fig 4 is a top view of it. Fig. 5 is a horizontal section of the same; and Fig. 6, at reduced scale, shows a modification of the construction of the device.

The stake proper consists of two parts, one (indicated by 7) being the part which when the stake is in position occupies part of the ground below the surface and into which it is driven. The other part (indicated by 8) is left projecting above the ground and serves as a means either directly or indirectly to which one end of the rope which holds the animal may be attached. These two parts are in line with each other, one being practically a continuation of the other. The lower part is pointed, as shown, to facilitate its entrance into the ground, and at the upper end of this part— that is, between the ends of the stake—there is an annular projection 9, which I call the "lower anvil." At the upper end of the stake there is a similar projection 10, which I call the "upper anvil." The reason for using this term will be presently understood as soon as the function of these parts is explained. Mounted on this upper part 8 and between projections 9 and 10 thereon there is a solid block of metal 11, with flat upper and lower sides, which sides are also parallel to each other. Otherwise this block may be square, polygonal, or round, as shown. In view of its intended function I call this block a "ramhead." It has a central perforation which receives part 8 of the stake, the fit being such as to allow it to travel freely up and down on this part 8 and between the anvils 9 and 10 thereon. At diametrically opposite points and near the outer edge of ram-head 11 there are two rods 12, one on each side, which project upwardly parallel to each other and have at their upper ends a handle 13 between them.

The manipulation for driving the stake into the ground is now very simple and consists of setting the pointed end of the stake down onto the ground at the desired point, as shown in Fig. 2, the device being grasped at the handle 13, after which this latter is moved up and down, force being exerted upon the downward stroke, so as to cause ram-head 11 to strike the upper side of the lower anvil 9. A sufficient number of blows are thus successively delivered until the stake is driven into the ground, as shown in Fig. 3, after which the handle is released, and the upper or striking part of the device is allowed to simply drop down upon the lower part, as shown in Fig. 1, and on which it rests during the succeeding use of the device. For withdrawing the stake instead of pulling it up, as is now done, the striking device is used again, and, as shown in Fig. 3, the blows are delivered in opposite direction and against the under side of the upper anvil 10. It will now be clearly seen that no implements of any kind are required for planting or withdrawing this stake, since the striking device forms a part of it and goes with it all the time. The free end of rope 14 may now be attached in any suitable manner. It might be simply tied to one of rods 12 or to part 8 of the stake or to a ring loosely hung on these parts, or a ring 15 may be secured to the ram-head to receive the end of the rope, or a tethering-rod 16 may be hingedly attached thereto, to the upper end of which the rope would be attached. A spring 17 holds this rod normally elevated to keep part of the rope off the ground, but yields to the pull of the animal, so that after being straightened out the strain on it is in a longitudinal direction, preventing bending of the rod and also lessening the effect on the stake, which by reason of the larger leverage would tend to upset the device. This rod may be of any suitable height. The upper part of the device being free to rotate about the lower one—that is, about the stake proper (see Fig. 4)—it is plain that the rope cannot wind up on the device in case the animal keeps traveling continually about the same.

By preference the device is entirely of metal, (wrought iron or malleable,) although the stake proper might be of wood, attached in a suitable manner to the under side of the lower anvil-head, as shown in Fig. 6, the attachment being such as to permit renewal of this part of the stake. The device may be further modified, as shown in Fig. 6, where the ram-head 11 instead of being carried by two rods 12 is carried by one only, the perforation in this case instead of being in the ram-head being in the upper anvil. There would also be two parts 8 above the ground to connect the two anvils instead of one, and between which parts the ram-head would be guided. I am aware that the device cannot readily be made integrally; but the joining of the different parts may be done in various ways and presents no difficulty to the metal-worker. For instance, the upper anvil may be a separate piece to be riveted or forged onto the upper end of the stake. Rods 12 and handle 13 may be in one piece and forged or riveted onto the ram-head, &c.

This device may also be used for other purposes where a stake or fixed contrivance is required and to be secured in a similar manner by being driven into the ground—as, for instance, in tenting for stretching ropes, lines, &c.

Having described my invention, I claim as new—

1. In a grazing-stake, the combination with the stake proper, of a striking device carried by the upper part of the same, it being adapted by manipulation to deliver blows in opposite directions, and projections on the stake which receive these blows the construction being such as to permit attachment of a rope.

2. A grazing-stake having projections on its upper part spaced vertically apart, a striking device adapted to travel between them, a handle for manipulating this device in a manner to deliver blows against either one of these projections and means permitting attachment of a rope.

3. A grazing-stake, a ram-head carried thereby and adapted to travel thereon in an axial direction, projections on the stake which limit the travel of the ram-head, a handle on this latter whereby it may be manipulated to deliver blows against either projection and means permitting attachment of a rope.

4. A grazing-stake having an anvil between its ends, an anvil at its upper end, a ram-head carried on the part of the stake between the anvils, it being free to travel thereon in either direction, a handle on the ram-head permitting its manipulation in a manner to deliver blows against either one of the anvils and means permitting attachment of a rope.

5. A grazing-stake consisting substantially of two parts one forming the stake proper and the other being the driving device therefor, this latter part being carried on the upper part of the former one in a manner to be free to rotate thereon and means permitting attachment of a rope.

In testimony whereof I hereunto set my signature in the presence of two witnesses.

JOHN R. McGORON.

Witnesses:
C. SPENGEL,
ARTHUR KLINE.